(12) United States Patent
Marsden et al.

(10) Patent No.: US 8,359,051 B2
(45) Date of Patent: Jan. 22, 2013

(54) WIRELESS MASTER-SLAVE DISTRIBUTED COMMUNICATIONS NETWORK

(75) Inventors: Ian A. Marsden, Redhill (GB); Paul R. Marshall, Salfords (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1300 days.

(21) Appl. No.: 10/145,665

(22) Filed: May 15, 2002

(65) Prior Publication Data

US 2002/0173321 A1 Nov. 21, 2002

(30) Foreign Application Priority Data

May 17, 2001 (GB) ................................ 0112017.9

(51) Int. Cl.
*H04B 7/00* (2006.01)
(52) U.S. Cl. ........................ 455/500; 370/254
(58) Field of Classification Search .............. 455/41.1, 455/41.2, 41.3, 502, 503, 500, 14.1, 14.2, 455/14.3; 370/218, 238, 238.1, 254–256

See application file for complete search history.

(56) References Cited

U.S. PATENT DOCUMENTS

| | | | | |
|---|---|---|---|---|
| 5,369,784 | A * | 11/1994 | Nelson | 455/503 |
| 5,434,490 | A | 7/1995 | Ishida et al. | |
| 5,815,668 | A * | 9/1998 | Hashimoto | 709/238 |
| 5,920,267 | A * | 7/1999 | Tattersall et al. | 370/258 |
| 6,160,795 | A * | 12/2000 | Hosemann | 370/256 |
| 6,590,867 | B1 * | 7/2003 | Ash et al. | 370/236 |
| 6,775,258 | B1 * | 8/2004 | van Valkenburg et al. | 370/338 |

FOREIGN PATENT DOCUMENTS

| | | | |
|---|---|---|---|
| JP | 6053891 | A | 2/1994 |
| JP | 6177912 | A | 6/1994 |
| JP | 9083528 | A | 3/1997 |
| JP | 11509992 | A | 8/1998 |

(Continued)

OTHER PUBLICATIONS

Bhagwat F et al: "A Routing Vector Method (RVM) for Routing in Bluetooth Scatternets" International Workshop on Mobile Multimedia Communications, Nov. 15, 1999, pp. 375-379.*

(Continued)

*Primary Examiner* — Nay A. Maung
*Assistant Examiner* — Angelica Perez

(57) ABSTRACT

A master-slave distributed communications network comprises a master node (10), a plurality of slave nodes (12 to 22), and links (VL) operatively interconnecting the slave nodes and the master node in accordance with a routing plan. Each slave node has means for storing an address of the next node in the routing plan for a message to be routed on an uplink to the master node and when sending a data packet to the master node it appends the prestored address and forwards the data packet to the next node. If the next node is not the master node, it, in turn, adds the prestored address of the next following slave node to the data packet thus lengthening the data packet and re-transmits it, and so on until the data packet reaches the master node.

Figure 1:
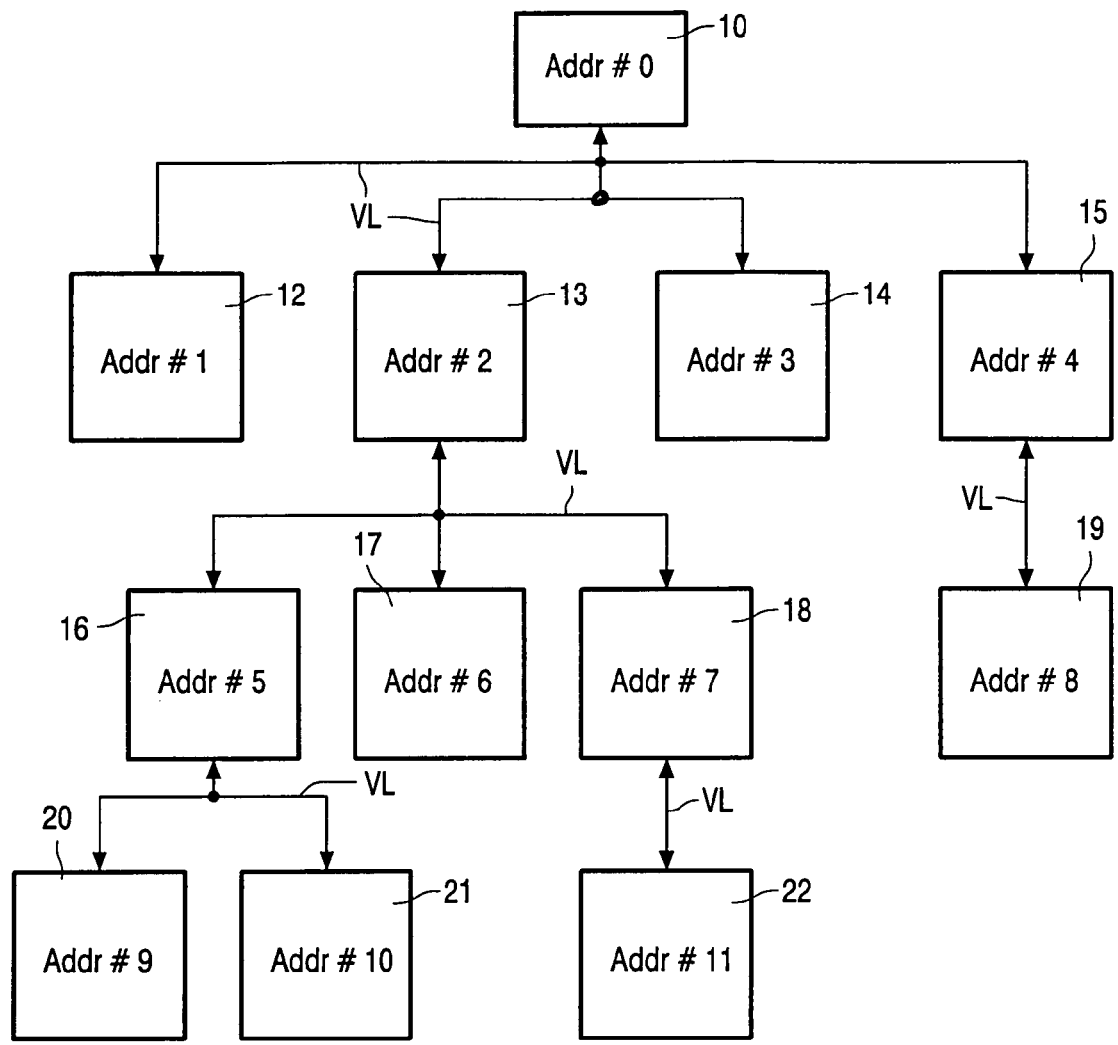

For a downlink message, the master node (10) using a prestored routing table includes in the data packet the addresses of all the slave nodes on the selected route. As the data packet is progressed from slave node to slave node, the address of each slave node which has forwarded the data packet is deleted thus shortening the overall length of the data packet.

29 Claims, 2 Drawing Sheets

FOREIGN PATENT DOCUMENTS

JP  2001237764 A  8/2001
WO  9955031 A1  10/1999

OTHER PUBLICATIONS

P. Bhagwat et al; "A Routing Vector Method (RVM) for Routing in Bluetooth Scatternets", International Workshop on Mobile Multimedia Communications, XX, XX, Nov. 15, 1999, p. 375-379, XP002137402.

Lee et al, "On-Demand Multicast Routing Protocol", IEEE, 1999, pp. 1298-1302.

Perkins et al, "Ad-Hoc On-Demand Distance Vector Routing", Mobile Computing Systems and Applications, 1999, 12 pages.

* cited by examiner

WIRELESS MASTER-SLAVE DISTRIBUTED COMMUNICATIONS NETWORK

The present invention relates to a wireless master-slave distributed communications network having particular, but not exclusive, application to multiple hop radio control networks, such as networks for the control of street lighting, and multiple hop radio monitoring networks.

Multiple hop radio networks typically comprise a master device or node which stores a routing table of the links between the master device and slave devices or nodes. Such networks have been found to be difficult to install and configure in an optimum manner. Complete knowledge of the network and its loading is usually essential. Also it has been necessary to preprogram into a slave device every anticipated communication path that a user of the slave device may require. Thus the quality of a network and its installation is dependent on the competency of the installer. Further any message being passed across the network to the master device from the outset needs to contain all of the addressing and routing information for the message to complete its route which in the case of several hops means that a data packet is long because of the need to include the addresses of all the slave nodes lying on the virtual route. In the field of low power data transmission it is known that shorter messages can be relayed more reliably across a network than longer messages. If the network changes, for example by the addition or removal of slave nodes, then information about these changes and their effects on the routing table have to be entered regularly on all the nodes. If a defined route fails due a slave node becoming defective then any slave nodes downstream of the affected slave node are orphaned until the problem is rectified by repairing the defective slave node or by allocating new routes the quality of which relies on an installer knowing the route to the respective slave devices. As a consequence of these shortcomings multiple hop radio networks have not been widely used. However with the advent of low cost radio solutions to many control and monitoring networks the interest in such networks is growing especially if the known shortcomings can be overcome.

It is an object of the present invention to enable multiple hop radio networks to adapt to changes on the networks.

It is another object of the present invention to facilitate a new slave node joining a multiple hop radio network.

According to a first aspect of the present invention there is provided a master-slave distributed communications network comprising a master node and a plurality of slave nodes, the master node and the slave nodes being operatively interconnected, wherein each slave node has means for storing an address of the next node in a route of a message to the master node.

According to a second aspect of the present invention there is provided a method of operating a master-slave distributed network comprising a master node and a plurality of slave nodes, the master node and the slave nodes being operatively interconnected, wherein a slave node wishing to send a data packet to the master node includes in the data a prestored address of the next node in a route to the master node and transmits the data packet.

By means of a slave node storing the address of the next node in the routing plan, the network can be modified by the addition or removal of slave nodes without all the nodes having to be updated to record these changes in a prestored complete routing plan. The route from a slave node to the master node is dynamically determined which provides flexibility in the configuration of the network following any changes affecting it. Another beneficial feature is that the data packet is shortest for the first hop of a message being propagated towards a master node which means that the data packet is inherently more reliable to transmit.

The network is built-up originally from the master node which is not in direct communication with all of the slave nodes. Thus when a slave node is added to or removed from the network only those slave nodes in its vicinity are involved in routing decisions.

According to a third aspect of the present invention there is provided a slave station for use as a slave node in a master-slave distributed communications network including a master node and a plurality of slave nodes, the slave station comprising transceiving means for communicating with at least one of the master node and the plurality of slave nodes, first memory means for storing the address of the slave station, second memory means for storing the address of the next node in a route to the master node, and processing means coupled to the transceiving means and the first and second memory means for adding the address of the said next node to a data packet to be transmitted to the master node.

According to a fourth aspect of the present invention there is provided a master station for use in a master-slave distributed communications network including the master station and a plurality of slave stations, the master station comprising transceiving means for communicating with the plurality of slave stations, memory means for storing routing data, and processing means for compiling routing information from the stored routing data and for adding the compiled routing information to a data packet, the routing information comprising the address of a destination slave station and, where applicable, the address of the or each intermediate slave station(s) through which the data packet will be passed.

Figure 2:
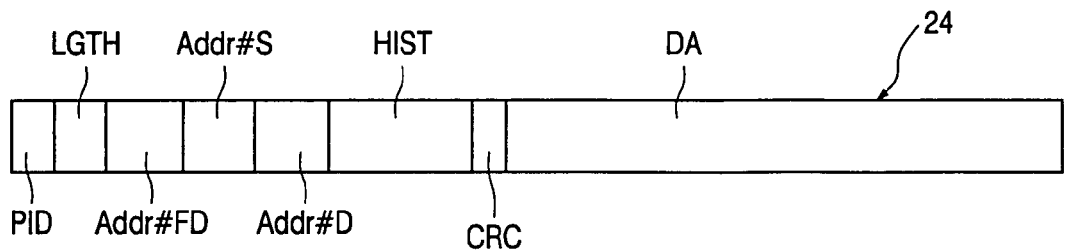
Figure 3:
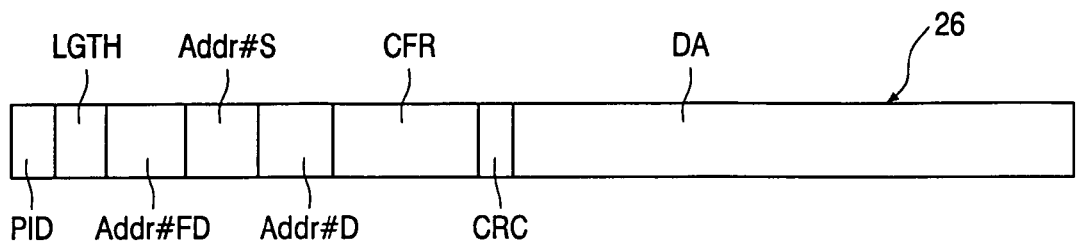
Figure 4:
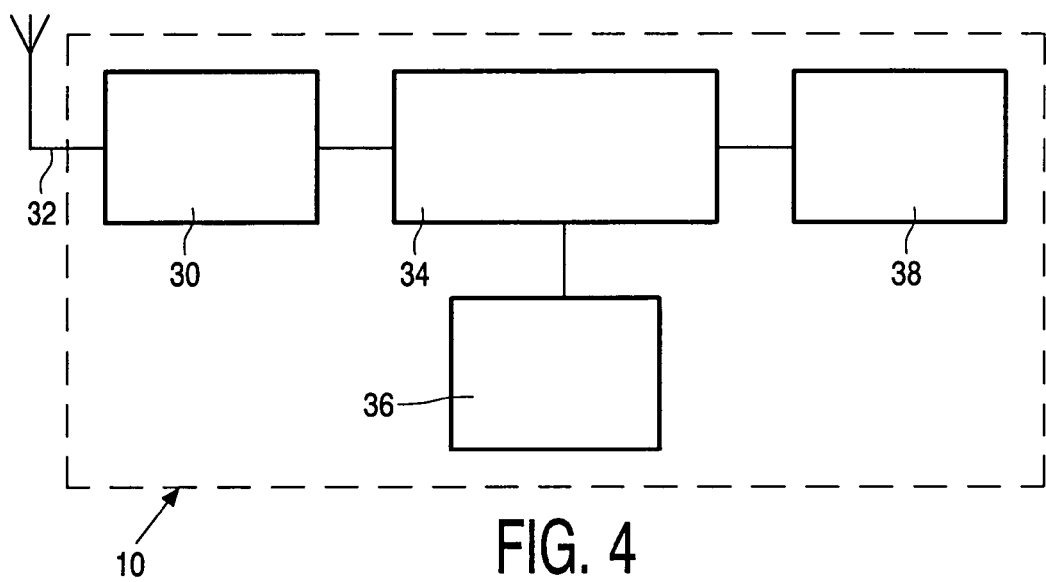
Figure 5:
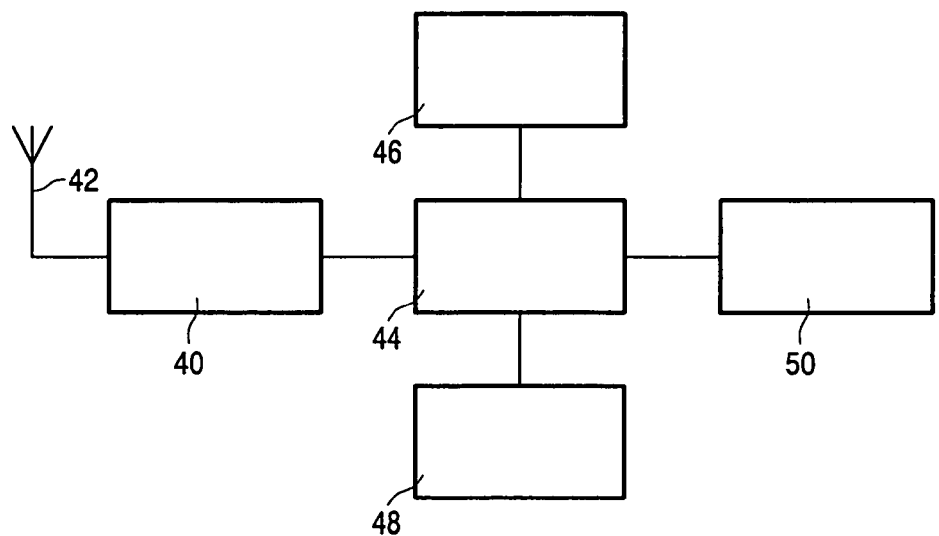

The present invention will now be described, by way of example, with reference to the accompanying drawings, wherein:

FIG. 1 is a diagrammatic representation of an embodiment of a multiple hop radio network, FIG. 2 is a diagrammatic representation of a data packet sent by a slave node, FIG. 3 is a diagrammatic representation of a data packet sent by a master node, FIG. 4 is a block schematic diagram of a master device, and FIG. 5 is a block schematic diagram of a slave device.

In the drawings the same reference numerals have been used to indicate corresponding features.

The multiple hop radio network shown in FIG. 1 comprises a master device or node 10 and a plurality of slave devices or nodes 12 to 22 which directly or indirectly are operatively coupled to the master device by links VL. A routing table comprising the slave nodes 12 to 22 and the links VL is stored in the master device 10. The illustrated network may comprise a control network for street lighting. As shown the slave nodes 12, 13, 14 and 15 can communicate directly with the master device 10 whereas the slave nodes 16, 17 and 18 and the slave node 19 have to communicate in a first hop with the slave nodes 13 and 15, respectively, before being able to communicate with the master device 10. The slave nodes 20 and 21 and the slave node 22 have to communicate in a first hop with the slave nodes 16 and 18, respectively, and then in a second hop with the slave node 13 before being able to communicate with the master device 10.

The master device 10 has an address Addr#0 and the slave nodes 12 to 22 have addresses Addr#1 to Addr#11, respectively. For convenience of reference, the links from the slave nodes 12, 13, 14 and 15 to the master device 10 are termed Route#0, where #0 is the address of the master device, and the links from the slave nodes 16, 17, 18 to the slave node 13 are termed Route#2, where #2 is the address of the slave node 13. Similarly the link from the slave node 19 to the slave node 15 is termed Route#4, the links from the slave nodes 20 and 21 are termed Route#5 and the link from the slave node 22 to the slave node 18 is termed Route#7.

The method in accordance with the present invention requires each of the slave nodes 12 to 22 to know and store only one piece of routing information for use when sending a data packet to the master node 10, this piece of information is the address of next node on the network to which messages for the master device should be passed. As a consequence the storage of routing information is distributed thus requiring relatively small amount of memory for routing information in each slave node. A slave node initiating the transmission of a message will include a header in the data packet containing the address of the next node in the routing table. However as the message progresses from node to node, the header becomes longer due to the inclusion of the addresses of successive nodes in the routing table.

When the master node wishes to send a message to a slave node, it includes the addresses of all the slave nodes on the route to the destination slave node. As the data packet progresses from slave node to slave node, the address of the transmitting slave node is deleted thus making the header shorter and the data packet inherently more reliable.

FIG. 2 illustrates an example of a data packet 24 which may be sent over a link VL to the master device. The data packet 24 comprises eight fields beginning with a packet identity PID, packet length LGTH, address of the final destination Addr#FD which in the case of the network shown in FIG. 1 will be the address of the master device or node Addr#0, address of the source (S) node Addr#S, address of the next destination (D) node Addr#D, history HIST which is the address(es) of the slave nodes through which the data packet has been passed, cyclic redundancy check bits CRC and a data field DA. The CRC field may be located after the data field. As an example consider the slave node 20 sending a data packet to the master device 10 on an uplink and the master device responding on a downlink. For the first uplink hop, the master address field will be Addr#0, the source node address will be Addr#9, the destination node will be Addr#5 and the history field HIST will be empty. At the slave device 16, the destination node will be changed to Addr#2 and Addr#5 is inserted into the HIST field and the data packet is transmitted on the next uplink hop. At the slave node 13, the destination node will be changed to Addr#0 and Addr#2 will be appended to the content of the HIST field and the data packet is forwarded to the master device 10. The respective messages may be locally handshaked at all the slave nodes through which they are passed.

FIG. 3 illustrates an example of a data packet 26 which may be sent by the master device to a slave node. The data packet has eight fields all of which apart from Complete Future Route CFR, which replaces HIST in the uplink data packet shown in FIG. 2, are the same as those shown in FIG. 2 and accordingly will not be described again. The field CFR contains the addresses of all the slave nodes which will be used on the downlink transmission and which have been derived from a routing table stored in master device 10. At the commencement of the master device 10 sending the data packet to the slave node 20, the final destination address Addr#FD is Addr#9, the source address Addr#S is master address Addr#0, the next destination address Addr#D is the address of the next hop Addr#2, and the CFR field contains Addr#5 and Addr#9. At the slave node 13, the Addr#2 is replaced by Addr#5 and Addr#5 is deleted in the CFR field. At the slave node 16, Addr#9 replaces Addr#5 in the destination field and Addr#9 is deleted from the CFR field which becomes empty.

Thus in the case of a wireless network for providing notification of street lamp failure to a central control station, each street lamp is monitored by a slave node and information about a lamp failure ripples through the network to the master device 10.

Each slave node has a unique address. If the network includes an address server then on installation, the user could request that the unique address be replaced by a more user friendly unique radio address which can be shorter and will therefore be more economical to transmit.

In order to enable the network to change dynamically to take in account slave nodes, such as street lamps, joining or leaving the network, various options are possible.

In the case of a new slave station being installed and not having any routing information pre-stored in it apart from its own unique address, it issues a message to all those slave devices in range requesting information on routing to the master device 10. The in-range slave devices respond to this message by passing back information relating to their first hop of a route to the master device. This information can additionally include other data such as the number of subsequent hops before a data packet reaches the master device, the loading on the route to the master device, the reliability of the route to the master device and factors relating directly to the slave nodes and their desire to be used to pass messages, for example that a slave node is battery powered and for battery economy reasons would prefer not to pass messages.

A processor in the new slave node can select a preferred route to the master device based on the number of hops, desired reliability and effective loading having regard to its own message rate. However the only information that it needs to store locally is the address of the first slave node in the route to the master device 10 and, if desired, sufficient information about the route that a further slave node added to the network can select a route in a similar manner. Once the new slave node has established its preferred routing to the master device 10 it is now in a position to offer the service of a route to the master device. It sends a network change message to the master device 10 stating that it has joined the network.

Another option which is possible is for a slave node to review its route to the master device 10 and then reconfigure itself if the existing route is no longer optimal because slave nodes have been added or removed.

In the event of a change to the network, a network change message is broadcast and a slave node on receipt of this message has the option of re-evaluating its routing decision based on the new information. In this mode, the slave node is free to alter its decision accordingly. If a slave node makes a decision to alter its route to the master device, it informs all those slave nodes which rely on it for their route so that they can then re-evaluate their routing. By this process of constant re-evaluation, a network can be maintained over a period of time even though it is changing in structure.

When a new slave node is first installed it issues a "request route to master" message. It will initially transmit zero as the allowable number of hops. The only node which can respond to this message is master device itself. Assuming that the master device is not within earshot the new slave node will not receive any responses. The new slave node will then try again with an increased value of allowable hops which allows the slave nodes on the network to respond if they meet the criteria. It will carry on this process until it receives a response. The response will inform the new slave node of the slave address to use as the first hop in its route to the master. To confirm the route to the master and also inform the master of the new slave node's presence, the new slave node will issue a "ping" to the master device using its own unique address, typically 48 bits long. The master device will then update its routing table and reply with a "pong" confirming the validity of the route and the address of the master device it should communicate with in the event of there being more than one master device or network. On receipt of the pong the new slave node knows that it has a valid registered route to the master device and can now commence attempting to connect to its allocated master device (assuming they are not the same device). The new slave node then issues an "indicate route to master" message to inform neighbouring slave nodes of the fact that it has a route to the master, and is then in the position to offer the service of a route to the master device. Slave nodes local to the new slave node, on receipt of an "indicate route to master" message may re-evaluate their own route to the master device.

If a slave node decides to change its route, it will confirm the new route by sending a ping to the master device. This process is carried out in the same way as before. Once the new slave node has joined the network it is then in a position to offer the service of a route to the master device itself.

Irrespective of the process of adding a new slave node to the network all the slave nodes on the network will have stored the first hop of the route back to the master device. A message to the master device will ripple through the network from slave node to slave node using the routing information stored in each node as it passes through. In contrast to network management messages, which must contain the entire route history on reaching the master device, this information does not need to be included for a data packet, leading to a shorter message.

By constructing "Complete Future Route" (CFR) a master can send a message to any slave node in the network. The master will use the routing table which it has learnt to construct the CFR.

If the master with which the new device should communicate with is different to that of the address server then the device will again issue a request route to master message but this time give the actual master address it is seeking. The process is carried out in exactly the same way as before.

Referring to FIG. 4 the master device 10 comprises a transceiver 30 coupled on one hand to an antenna 32 and on the other hand to a processor 34 which controls the operation of the master device 10 in accordance with software stored in a ROM 36. A RAM 38 stores routing data which is supplied to the processor as required depending on the current network architecture which is updated dynamically by slave nodes joining or leaving the network and by slave nodes determining a new optimum route following alterations, including breakdowns and repairs, to the network.

Referring to FIG. 5, a slave node comprises a transceiver 40 coupled on the one hand to an antenna 42 and on the other hand to a microprocessor 44 which controls the operation of the slave node in accordance with software stored in a ROM 46. Another ROM 48 storing the address of the slave node is coupled to the processor 44. Lastly a RAM 50 storing the address of the next slave node in the route to the master device 10 or the address of the master device 10 if it is the final station on the route.

In the present specification and claims the word "a" or "an" preceding an element does not exclude the presence of a plurality of such elements. Further the word "comprising" does not exclude the presence of other elements or steps than those listed.

From reading the present disclosure, other modifications will be apparent to persons skilled in the art. Such modifications may involve other features which are already known in the design, manufacture and use of master-slave distributed communications networks and component parts therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A master-slave distributed communications network comprising:
   a master node and a plurality of slave nodes operatively connected with the master node,
   said plurality of slave nodes including at least one intermediate slave node and at least one indirectly connected slave node connected with the master node by a route via the at least one intermediate slave node,
   said at least one indirectly connected slave node selecting said route to the master node substantially on the basis of a route reliability criterion.

2. The master-slave distributed radio communications network as in claim 1, wherein said at least one indirectly connected slave node examines available routes to the master node to determine which of said routes has a desired route reliability.

3. A method of operating a master-slave distributed radio communications network comprising:
   a master node and a plurality of slave nodes operatively connected with the master node,
   said plurality of slave nodes including at least one intermediate slave node and at least one indirectly connected slave node connected with the master node by a route via the at least one intermediate slave node,
   said at least one indirectly connected slave node selecting said route to the master node substantially on the basis of a route reliability criterion.

4. The method as in claim 3, comprising said at least one indirectly connected slave node storing in a respective memory, as necessary addressing information for passing a transmission to the master node, only the address of the next node in the selected route to the master node.

5. The method as in claim 3, comprising said master node including, in a data packet to be transmitted to the indirectly connected slave node, an address of each intermediate slave node in the selected route.

6. The method as in claim 5, comprising each said intermediate slave node in the selected route, upon receiving the data packet, removing from the data packet the address of the intermediate slave node and transmitting the altered data packet.

7. The method as in claim 3, comprising the at least one indirectly connected slave node comprising a new slave node requesting routing information from in-range slave nodes, receiving said routing information and determining which of the in-range slave nodes is a preferred next node in the selected route to the master node.

8. The method as in claim 3, comprising after a change in the network, the at least one indirectly connected slave node re-examining a pre-existing route to the master node and, in response to finding that said pre-existing route does not comply with the route reliability criterion, selecting a new route that does comply with said criterion.

9. The method as in claim 3, comprising said indirectly connected slave node comprising a new slave node that selects said route to the master node by steps including transmitting a "request route to master" message with the number of hops set to a predetermined minimum value and in response to not receiving a reply repeating the transmission of the "request route to master" message with the number of hops increased in value.

10. A slave station for use as a slave node in a distributed radio communications network including a master node and a plurality of slave nodes with at least one slave node being directly connected with the master node and at least a second slave node being indirectly connected with the master node using at least a third slave node between the second slave node and the master node, the slave station comprising:
  transceiving means for communicating with at least one of the master node and the plurality of slave nodes,
  first memory means for storing the address of the slave station,
  second memory means for storing the address of the next node in a route to the master node, and
  processing means coupled to the transceiving means and the first and second memory means for selecting said route to the master node substantially on the basis of a route reliability criterion.

11. The slave station as in claim 10, wherein said processing means deletes from a data packet to be retransmitted the address of the slave station.

12. A master-slave distributed radio communications network comprising:
  a master node and a plurality of slave nodes, the master node and the respective slave nodes being operatively interconnected, with at least one slave node being directly connected with the master node and at least a second slave node being indirectly connected with the master node using at least one third slave node between the second slave node and the master node,
  said second slave node selecting a route to the master node substantially on the basis of at least a route reliability criterion,
  said second slave node and each of said at least one third slave node retaining an address of a next node in the selected route of a message to the master node and including
  means for changing a routing address contained in a received data packet with the retained address of the next node.

13. The master-slave distributed radio communications network as in claim 12, wherein said second slave node and each of said at least one third slave node have means for appending the stored address of the next node in a route of a message to be send to the master node.

14. A method of operating a master-slave distributed radio communications network including a master node and a plurality of slave nodes, the master node and the slave nodes being operatively interconnected, with at least one slave node being directly connected with the master node and at least a second slave node being indirectly connected with the master node using at least one third slave node between the second slave node and the master node, the method comprising:
  said second slave node selecting a route to the master node substantially on the basis of a route reliability criterion,
  said second slave node sending a data packet to the master node by including a prestored address of the next node in said selected route to the master node and transmitting the data packet,
  said at least one third slave node, upon receiving the data packet, changing the address in the received data packet to an address of a next node in said selected route before transmitting said data packet to the next node on the selected route.

15. A method as in claim 14, said master node including addresses of the slave nodes on the selected route for packets to be transmitted to the second slave node.

16. The method as in claim 15, comprising said at least one third slave node, upon receiving a data packet for transmission to the second slave node, removing from the data packet the address of the at least one third slave node and transmitting the altered data packet to the second slave node.

17. The method as in claim 14, comprising said second slave node comprising a new slave node and transmitting an invitation message requesting routing information from in-range slave nodes, the new slave node selecting said route by receiving routing information and determining which of the in-range slave nodes is the preferred node in the new slave node's route to the master node, and storing the address of the preferred node.

18. The method as in claim 14, comprising said second slave node, after a change in the network, re-examining a pre-existing route to the master node and, in response to a finding that said pre-existing route does not comply with the route reliability criterion, selecting a new route that does comply with said criterion.

19. The method as in claim 14, comprising a new slave node transmitting a "request route to master" message with the number of hops set to a predetermined minimum value and in response to not receiving a reply repeating the transmission of the "request route to master" message with the number of hops increased in value.

20. A slave station for use as a slave node in a master-slave distributed radio communications network including a master node and a plurality of slave nodes with at least one slave node being directly connected with the master node and at least one second slave node being indirectly connected with the master node using at least one third slave node between the second slave node and the master node, said second slave node selecting a route to the master node substantially on the basis of a route reliability criterion, the slave station comprising transceiving means for communicating with at least one of the master node and the plurality of slave nodes, first memory means for storing the address of the slave station, second memory means for storing the address of a next node in a route to the master node, and processing means coupled to the transceiving means and the first and second memory means for changing the address of the next node in a data packet to be transmitted to the master node with the stored address of a next node in the selected route to the master node at each subsequent receiving slave node.

21. The slave station as in claim 20, wherein said processing means deletes the address of the slave station which is present in a data packet originating from the master node and received by the slave station.

22. A master station for use in a master-slave distributed radio communications network including the master station and a plurality of slave nodes, with at least one slave node being directly connected with the master station and at least one second slave node being indirectly connected with the master station using at least a third slave node between the second slave node and the master station, said at least one second slave node selecting a route to the master station substantially on the basis of a route reliability criterion, the master station comprising:
- transceiving means for communicating with the plurality of slave stations,
- memory means for storing routing data, and
- processing means for compiling routing information from the stored routing data and for changing the routing information in a data packet, the routing information comprising the address of a destination slave station and, where applicable, the address of the, or each, intermediate slave station(s) through which the data packet will be passed.

23. A slave station for use as a slave node in a distributed radio communications network including a master node and a plurality of slave nodes with at least one slave node being directly connected with the master node and at least a second slave node being indirectly connected with the master node using at least a third slave node between the second slave node and the master node, the slave station comprising:
- a transceiver configured to communicate with at least one of the master node and the plurality of slave nodes,
- a first memory configured to store the address of the slave station,
- a second memory configured to store the address of the next node in a route to the master node, and
- a processor coupled to the transceiver, the first memory and the second memory and configured to select said route to the master node substantially on the basis of a route reliability criterion.

24. The slave station of claim 23, wherein said processor is configured to delete from a data packet to be retransmitted the address of the slave station.

25. A master-slave distributed radio communications network comprising:
- a master node and a plurality of slave nodes, the master node and the respective slave nodes being operatively interconnected, with at least one slave node being directly connected with the master node and at least a second slave node being indirectly connected with the master node using at least one third slave node between the second slave node and the master node,
- said second slave node selecting a route to the master node substantially on the basis of at least a route reliability criterion,
- said second slave node and each of said at least one third slave node retaining an address of a next node in the selected route of a message to the master node and including a processor configured to change a routing address contained in a received data packet with the retained address of the next node.

26. The master-slave distributed radio communications network of claim 25, wherein said second slave node and each of said at least one third slave node comprises a processor configured to append the stored address of the next node in a route of a message to be send to the master node.

27. A slave station for use as a slave node in a master-slave distributed radio communications network including a master node and a plurality of slave nodes with at least one slave node being directly connected with the master node and at least one second slave node being indirectly connected with the master node using at least one third slave node between the second slave node and the master node, said second slave node selecting a route to the master node substantially on the basis of a route reliability criterion, the slave station comprising:
- a transceiver configured to communicate with at least one of the master node and the plurality of slave nodes,
- a first memory configured to store the address of the slave station,
- a second memory configured to store the address of a next node in a route to the master node, and
- a processor coupled to the transceiver, the first memory and the second memory and configured to change the address of the next node in a data packet to be transmitted to the master node with the stored address of a next node in the selected route to the master node at each subsequent receiving slave node.

28. The slave station of claim 27, said processor is configured to delete the address of the slave station which is present in a data packet originating from the master node and received by the slave station.

29. A master station for use in a master-slave distributed radio communications network including the master station and a plurality of slave nodes, with at least one slave node being directly connected with the master station and at least one second slave node being indirectly connected with the master station using at least a third slave node between the second slave node and the master station, said at least one second slave node selecting a route to the master station substantially on the basis of a route reliability criterion, the master station comprising:
- a transceiver configured to communicate with the plurality of slave stations,
- a memory configured to store routing data, and
- a processor configured to compile routing information from the stored routing data and for changing the routing information in a data packet, the routing information comprising the address of a destination slave station and, where applicable, the address of the, or each, intermediate slave station through which the data packet will be passed.

* * * * *